United States Patent [19]

Bertsch

[11] 3,926,741

[45] Dec. 16, 1975

[54] COLUMN DEVICE

[75] Inventor: Erich Bertsch, Lorrach (Baden), Germany

[73] Assignee: Lonza Ltd., Gampel/Valais, Basel, Switzerland

[22] Filed: Jan. 30, 1974

[21] Appl. No.: 437,940

[52] U.S. Cl.......... 202/269; 261/114 R; 261/114 JP
[51] Int. Cl.².................... C10B 29/00; C10B 45/00
[58] Field of Search .......... 202/158, 241, 270, 269; 203/DIG. 7; 261/114 R, 113, 114 UT, 114 JP, 114 TC; 23/270.57; 196/14.52

[56] References Cited

UNITED STATES PATENTS

| 2,241,370 | 5/1941 | Armstrong | 261/114 R |
| 3,094,575 | 6/1963 | Peterson | 261/114 R |
| 3,393,133 | 7/1968 | Baird | 202/158 |

FOREIGN PATENTS OR APPLICATIONS

| 1,162,328 | 2/1964 | Germany | 202/158 |
| 1,109,913 | 11/1955 | France | 261/114 R |
| 892,049 | 3/1961 | United Kingdom | 202/158 |

Primary Examiner—Norman Yudkoff
Assistant Examiner—D. Sanders
Attorney, Agent, or Firm—Toren, McGeady and Stanger

[57] ABSTRACT

A column assembly having a plurality of removable separating floors therein is provided with sealing means in compression between the floors and the interior wall of the column to provide a fluid tight seal. Seal retaining means are fixed to each of the floors at a location thereon proximate the interior wall of the column. The sealing means are formed as as annularly shaped hollow rings capable of being inflated to form the seal and deflated to facilitate removal of the floors from the column.

10 Claims, 1 Drawing Figure

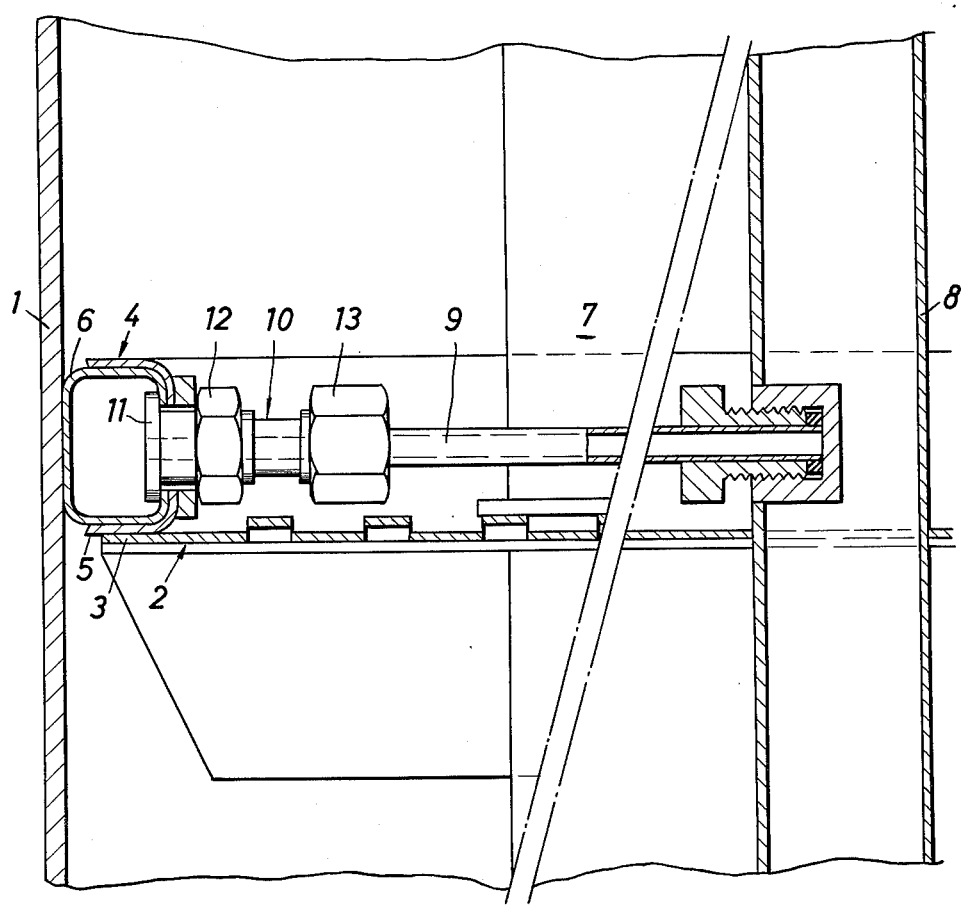

COLUMN DEVICE

This invention relates to a cylindrical column device having removable separating floors.

Column devices must be cleaned at regular intervals or when another substance than has hitherto been processed has to be processed therein. To do this it is necessary to remove the intermediate floors, which in use must of course be sealingly connected to the column wall. This has hitherto led to expensive designs for sealing but readily detachable connection of the intermediate floors within the cylindrical casing, and also to time consuming procedure for dismantling and erection.

It is the object of the invention to obviate or at least to mitigate the aforementioned problems.

According to the invention there is provided a cylindrical column comprising removable internal separating floors, respective deformable hoses disposed about the edges of the floors adjacent the wall of the column in retaining means, and means for the supply of a pressurising agent to the hoses, whereby in use, on pressurising the hoses to a pressure which is greater than the pressure in the column, each hose is pressed tight against the casing and against its retaining means thereby to produce a fluid tight seal between the floors and the casing.

Advantageously, the separating floors are connected together to form a unit which is withdrawable from and insertable into the column when the hoses are not pressurised. When the unit is removed it is readily possible to clean the faces of the separating floors and the internal face of the column. After cleaning, the unit can be equally easily replaced in the cylinder and a tight sealing of the edges of the separating floors with the cylindrical casing produced by again pressurising the hoses.

The present column can for example be a distillation column, an exchange column or a concentration column. The separating floors, which are exchangeable, can be for example perforated floors or globe trays. The column can, if desired, contain supplementary separating floors that are not connected in a fluid-tight manner to the cylindrical casing, for example the globes of globe trays can be alternately directed upwards and downwards and only every other globe tray made to seal at its connection to the cylindrical casing.

In order to enable the invention to be more readily understood, reference will now be made to the accompanying drawing, which illustrates diagrammatically and by way of example an embodiment thereof and which is a longitudinal section through an edge zone and a central part of a column in the vicinity of a separating floor.

Referring to the drawing, the column comprises a cylindrical casing 1, and a separating floor 2, which forms a perforated floor of the part of the column illustrated. It will be appreciated that there are a number of such floors in the column. On an edge portion 3 of the separating floor 2 is disposed a channel-section ring 4 concentric with the separating floor 2. The channel is a U-section channel. The opening of the U-section is directed radially outwards towards the casing 1. The lower limb 5 of the ring 4 is joined firmly and sealingly with the edge portion 3, for example by welding. An inflatable deformable hose 6 is carried in the hollow space defined within the ring 4. The cross-sectional area of the hose 6 is greater than the cross-sectional area of the hollow space defined within the ring 4, the cross-sectional area of the part of the hose within the ring 4 being greater than the cross-sectional area of the part of the hose protruding out of the ring 4. The ring 4 extends radially only slightly beyond the boundary of the separating floor 2 and is spaced from the casing 1. This has the effect that when the hose is inflated it can only expand in response to its internal pressure in the small space between the ends of the limbs of the ring and the casing 1, and is thus firmly held against the casing 1. The hose is also held firmly in the ring 4, so that a reliable seal is attained between the ring 4 and the casing 1. Since the ring 4 is sealingly connected to the separating floor 2 a seal is produced between the floor 2 and the casing 1. The separating floor 2 is rigidly joined to the other separating floors (not shown) of the column by supports 7. On the axis of the column is disposed a tube 8 which is sealingly joined to the floor of the column, e.g. by welding, and which is connected through a linking pipeline 9 with the interior of the hose 6 (and through corresponding linking pipelines not illustrated with the interiors of the hoses of other separating floors). A connector 10 links the hose 6 with the pipeline 9. One end of the connector 10 passes through a hole in the web part of the ring 4 joining the limbs of the U-section and through a hole in the wall of the hose 6 and terminates in a flange 11, within the hose 6. The flange 11 is pressed firmly onto the edge of the hole in the hose by means of a nut 12 carried on a ring 4. The other end of the connector 10 is attached to the linking pipeline 9 through a pipe coupling with a sleeve nut 13.

The hose is made of an elastomeric material, such as a natural or synthetic rubber. In the selection of the material for the hose, the materials to be processed in the column have to be taken into consideration.

While the column is in operation a positive pressure is maintained in the hoses 6 through a pressurising agent in the pipeline system 8, 9 which pressure is so much greater than the pressure within the column that the hose 6 is pressed tight against both the ring 4 and the casing 1, so as to make a seal between the casing 1 and the floors 2, as previously described. To this end it is for example possible to connect a gas cylinder with a reducing valve to one end of the pipe 8 and to close off the other end of the pipe. The pressurising agent can be air, for example. There is, however, a possibility of the pressurising agent escaping at any unsealed points, and if this could have an unfavourable effect upon the materials being processed in the column, it may be advantageous, for example, to use an inert gas such as nitrogen as the pressurising means.

In order to create and maintain in the hoses a pressure that is greater than the pressure in the column, it may suffice in the case of a column which operates at lower than atmospheric pressure for the pipe 8 to be connected to the external air, provided that in these circumstances the pressure difference and the flexibility of the hose is such that the hose is pressed sufficiently firmly into the ring 4 and onto the casing to produce a seal.

The separating floors 2 with the rings 4, hoses 6 and linking pipelines 9, the pipe 8 and the supports 7 advantageously constitute a single structural unit. This unit can easily be withdrawn from the cylinder after relieving the hoses 6 of pressure. The empty cylinder and the unit, which when removed is accessible from all sides, can then easily be cleaned. The unit can then be pushed back into the cylinder, after which the separating floors can again be sealed tight to the casing on pressurising of the hoses 6.

Instead of single-walled hoses, double walled hoses may be used, the outer wall being of a thermoplastic material and the inner wall being of an elastomeric material.

It will be seen that the embodiment of the invention which has been particularly described, has the advantage of having a very simple construction.

What we claim is:

1. An assembly comprising a cylindrical column having an interior wall, a plurality of removable axially spaced separating floors extending laterally across the interior of said column adjacent said wall, seal retaining means fixed to said floors at a location thereon proximate said wall, sealing means compressed between said interior wall and said seal retaining means to provide a fluid tight seal therebetween, said sealing means comprising a hollow ring formed of material capable of being inflated and deflated by introduction of fluid under pressure thereinto extending circumferentially completely about the interior of said column, and fluid supply means for inflating said sealing means to an internal pressure greater than pressure existing against the exterior of said sealing means, and for deflating said means to facilitate removal of said floors from within said column.

2. The assembly according to claim 10 wherein said sealing means comprise hoses.

3. A column as claimed in claim 2, wherein the separating floors are connected together to form a unit which is withdrawable from and insertable into the column when the hoses are not pressurised.

4. A column as claimed in claim 2, wherein each hose is located in a respective channel-section ring concentric with its separating floor, the cross-sectional area of the channel being smaller than the external cross-sectional area of the hose, one limb of the ring being fixed sealingly to an edge portion of the separating floor and the open side of the channel being directed radially outwards towards the cylindrical casing, and wherein connection leading to a pipeline for the pressurising agent leads through the wall of the ring into the hose.

5. A column as claimed in claim 4, wherein the cross-sectional area of the part of the hose lying within the channel of the ring is greater than the cross-sectional area of the part of the hose protruding outside the channel of the ring.

6. A column as claimed in claim 2, wherein the separating floors are spaced from the wall of the column.

7. A column as claimed in claim 2, wherein the channel-section rings are spaced from the wall of the column.

8. A column as claimed in claim 2, wherein the hoses are of an elastomeric material.

9. A column as claimed in claim 2, wherein the hoses are double-walled, the outer wall being of a thermoplastic material and the inner of an elastomeric material.

10. A column as claimed in claim 2, wherein the means for the supply of a pressurising agent comprises a supply line passing through all the separating floors.

* * * * *